US008439752B2

(12) United States Patent
Beerhorst et al.

(10) Patent No.: US 8,439,752 B2
(45) Date of Patent: May 14, 2013

(54) BONUS TRIGGER SOUNDS BUILDING INTO A SONG

(75) Inventors: Ralph Beerhorst, Evanston, IL (US); Benjamin T. Gomez, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 799 days.

(21) Appl. No.: 12/616,947

(22) Filed: Nov. 12, 2009

(65) Prior Publication Data

US 2011/0111850 A1 May 12, 2011

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl.
USPC .................................. 463/35; 463/16; 463/20

(58) Field of Classification Search .................... 463/16, 463/20, 25
See application file for complete search history.

(56) References Cited

U.S. PATENT DOCUMENTS

| | | | | |
|---|---|---|---|---|
| 6,554,703 | B1 | 4/2003 | Bussick et al. | 463/20 |
| 6,561,908 | B1 | 5/2003 | Hoke | 463/35 |
| 6,638,169 | B2 | 10/2003 | Wilder et al. | 463/35 |
| 6,729,618 | B1 | 5/2004 | Koenig et al. | 273/138.2 |
| 6,729,955 | B2 | 5/2004 | Bennett et al. | 463/20 |
| 6,769,985 | B1 | 8/2004 | Laakso et al. | 463/25 |
| 6,843,723 | B2 | 1/2005 | Joshi | 463/25 |
| 6,848,996 | B2 | 2/2005 | Hecht et al. | 463/35 |
| 6,923,718 | B2 | 8/2005 | Brossard | 463/16 |
| 6,935,955 | B1 | 8/2005 | Kaminkow et al. | 463/35 |
| 6,939,226 | B1 | 9/2005 | Joshi | 463/20 |
| 6,960,136 | B2 | 11/2005 | Joshi et al. | 463/25 |
| 6,974,385 | B2 | 12/2005 | Joshi et al. | 463/20 |
| 6,991,543 | B2 | 1/2006 | Joshi | 463/35 |
| 7,105,736 | B2 | 9/2006 | Laakso | 84/615 |
| 7,355,112 | B2 | 4/2008 | Laakso | 84/615 |
| 7,364,508 | B2 | 4/2008 | Loose et al. | 463/30 |
| 7,367,886 | B2 | 5/2008 | Loose et al. | 463/35 |
| 7,479,063 | B2 | 1/2009 | Pryzby et al. | 463/35 |
| 7,758,415 | B2 * | 7/2010 | Kojima | 463/20 |
| 2003/0216182 | A1 * | 11/2003 | Gauselmann | 463/40 |
| 2003/0232645 | A1 * | 12/2003 | Suda et al. | 463/20 |

(Continued)

OTHER PUBLICATIONS

Harmonix Music Systems, Frequency game manual, 2001, Harmonix Music Systems.*

(Continued)

*Primary Examiner* — Arthur O. Hall
*Assistant Examiner* — Wei Li
(74) *Attorney, Agent, or Firm* — Nixon Peabody LLP

(57) ABSTRACT

A system and method of playing a multi-track musical composition during a wagering game in which musical tracks are successively added as bonus triggers occur, starting from an introduction portion of the musical composition and culminating in a main theme or chorus of the musical composition. Upon receipt of a wager input at a gaming terminal, a base wagering game is initiated during which several bonus triggers can occur, satisfying eligibility to conduct a bonus game. As each bonus trigger occurs, the musical composition adds a musical track to the introduction being played through audio speakers of the gaming terminal, increasing its instrumentation density to create a richer and denser sound. When the last bonus trigger occurs during the base wagering game, the music launches seamlessly from the introduction that has just been built up into the main theme or chorus of the music, which serves as the accompaniment music for the bonus game.

24 Claims, 8 Drawing Sheets

U.S. PATENT DOCUMENTS

| | | | | |
|---|---|---|---|---|
| 2005/0054440 | A1 | 3/2005 | Anderson et al. | 463/30 |
| 2005/0124415 | A1 | 6/2005 | Centuori et al. | 463/35 |
| 2005/0164785 | A1 | 7/2005 | Connelly | 463/35 |
| 2005/0164786 | A1 | 7/2005 | Connelly | 463/35 |
| 2005/0164787 | A1 | 7/2005 | Connelly | 463/35 |
| 2005/0164788 | A1 | 7/2005 | Grabiec | 463/35 |
| 2005/0277469 | A1 | 12/2005 | Pryzby et al. | 463/35 |
| 2005/0282631 | A1 * | 12/2005 | Bonney et al. | 463/35 |
| 2006/0009285 | A1 | 1/2006 | Pryzby et al. | 463/30 |
| 2006/0046829 | A1 | 3/2006 | White | 463/20 |
| 2007/0006708 | A1 | 1/2007 | Laakso | 84/1 |
| 2007/0036368 | A1 | 2/2007 | Hettinger et al. | 381/107 |
| 2007/0173309 | A1 | 7/2007 | Rigsby | 463/16 |
| 2007/0293304 | A1 | 12/2007 | Loose et al. | 463/25 |
| 2008/0113716 | A1 | 5/2008 | Beadell et al. | 463/46 |
| 2008/0161108 | A1 | 7/2008 | Dahl et al. | 463/35 |
| 2008/0242411 | A1 | 10/2008 | Connelly | 463/35 |
| 2009/0170597 | A1 | 7/2009 | Bone et al. | 463/25 |
| 2009/0186696 | A1 | 7/2009 | Shai-Hee | 463/35 |
| 2009/0298579 | A1 | 12/2009 | Radek et al. | 463/25 |

OTHER PUBLICATIONS

Atronic Group Article: New Era; by GGB Staff; Global Gaming Business; dated Nov. 2008; (5 pages).

Atronic Americas Article; Tree of Riches, dated Nov. 2008; (1 page).

Tree of Riches Article; dated Nov. 2008; (2 pages).

* cited by examiner

BONUS TRIGGER SOUNDS BUILDING INTO A SONG

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to wagering games, and methods for playing wagering games, and more particularly, to a wagering game in which layered bonus trigger sound tracks flow into a main theme of a bonus song.

BACKGROUND OF THE INVENTION

Gaming terminals, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options.

Music played through the gaming terminal's speakers can trigger emotional responses in players, helping to build anticipation and excitement in the player as the game outcome is revealed. Use of music to build anticipation and excitement can be further exploited to hold the player's interest in wagering on a particular wagering game.

SUMMARY OF THE INVENTION

According to an aspect of the present disclosure, a method of playing a multi-track musical composition during a wagering game that successively adds musical tracks that form an introduction portion of music that leads into a main theme or chorus of the musical composition, includes: receiving an input indicative of a wager at a gaming terminal; responsive to receiving the input, conducting a base wagering game at the gaming terminal; providing at least two bonus triggers in the base wagering game such that responsive to all of the bonus triggers occurring during the base wagering game, a bonus game is initiated; responsive to a first bonus trigger occurring during the base wagering game, playing through an audio speaker system a first track of the musical composition to initiate an introduction portion of the musical composition; responsive to a second bonus trigger occurring during the base wagering game, playing a second track of the musical composition through the audio speaker system such that both the first and the second tracks are played through the audio speaker system simultaneously; and following occurrence of a last one of the bonus triggers during the base wagering game, playing through the audio speaker system the main theme or chorus of the musical composition that includes the first and second tracks, and initiating the bonus game.

The method can further include continuing to play the main theme or chorus of the musical composition during the bonus game. The method can further include ceasing playing the musical composition through the audio speaker system responsive to not all of the bonus triggers occurring during the base wagering game. The method can further include mixing the second track of the musical composition with the first track.

The base wagering game can be a game of slots. The at least two bonus triggers can include a third bonus trigger. The method can further include, responsive to the third bonus trigger occurring during the base wagering game, playing a third track of the musical composition through the audio speaker such that the first, second, and third tracks are played through the audio speaker simultaneously. The method can further include mixing the third track with the first and second tracks.

The first track and the second track can each be produced by a distinct solo iteration or combination of a percussion, stringed, electronic, wind, brass, or vocal instrument, and wherein the musical composition is a song or an orchestral composition. The method can further include storing the first and the second tracks as separate audio files in a memory accessible by the gaming terminal. The second track can be pre-mixed with the first track and stored as an audio file in a memory accessible by the gaming terminal.

The audio speaker system can include a plurality of audio speakers each associated with an audio channel. The audio speakers can be positioned on opposite sides of a player at the gaming terminal. The first track can be played through at least one of the audio channels. The method can further include, responsive to the second bonus trigger occurring, changing the directionality of the sound produced during play of the musical composition by playing the second track through at least another one of the audio channels.

The method can further include changing a percentage of sound played during play of the first track through the plurality of audio speakers responsive to the second track being played. The audio speaker system can include a plurality of audio speakers each associated with an audio channel. The second track can be played through more audio channels compared to the first track.

The main theme or chorus can be played through the plurality of audio speakers in full surround utilizing all of the audio channels associated with the plurality of audio speakers. The audio speaker system can include a front set of audio speakers in the gaming terminal and a plurality of auxiliary audio speakers surrounding a player at the gaming terminal. The method further include playing the base wagering game through the front set of audio speakers only. The first track can be played through a first number of the auxiliary audio speakers. The second track can be played through a second number of the auxiliary audio speakers, the second number being greater than the first.

According to another aspect of the present disclosure, a method of conducting a base wagering game for a human player, the wagering game including a game sequence in which a player provides an input and a wagering game outcome is determined, includes: using a user interface device to accept the player input, and transforming the player input to electronic data signals indicative of a wager to play the base wagering game; using one or more processors to interpret the wager from the data signals and to cause the recording of a digital representation of the wager in one or more storage devices; using at least one of the processors to initiate the game sequence of the base wagering game on the gaming apparatus, the game sequence including at least two bonus triggers; responsive to a first bonus trigger occurring during the game sequence, playing a first track of the musical composition to initiate an introduction portion of the musical composition; responsive to a second bonus trigger occurring during the game sequence, adding a second track of the musical composition to the first track and playing the first and the second tracks simultaneously; and following occurrence of a last one of the bonus triggers during the game sequence, playing the main theme or chorus of the musical composition including the first and second tracks; using at least one of the processors to cause an audio device to play the musical composition; and initiate the bonus game while playing the main theme or chorus.

According to yet another aspect of the present disclosure, a method of playing a musical composition that employs instrumentation during a base wagering game, includes: receiving an input indicative of a wager at a gaming terminal; responsive to receiving the input, conducting a base wagering game at the gaming terminal, the base wagering game including a plurality of bonus triggers including a first bonus trigger and a final bonus trigger; responsive to an occurrence of the first bonus trigger during the base wagering game, playing through an audio speaker an introduction portion of the musical composition; responsive to an occurrence of each subsequent one of the bonus triggers during the base wagering game, successively, with each such occurrence, increasing a density of the instrumentation of the musical composition played through the audio speaker until the final bonus trigger occurs; and responsive to the occurrence of the final bonus trigger, initiating the bonus game while playing a main theme or chorus of the musical composition.

The bonus triggers can include an intermediate bonus trigger. The density of the instrumentation can have an initial density in response to the occurrence of the first bonus trigger. The density can be increased relative to the initial density to an intermediate density in response to the occurrence of the intermediate bonus trigger. The density can be further increased relative to the intermediate density to a full density in response to the occurrence of the final bonus trigger. The musical composition can also employ voice. The introduction portion can transition to the main theme or chorus of the musical composition responsive to the occurrence of the final bonus trigger such that the introduction portion and the main theme or chorus are audibly contiguous.

According to still another aspect of the present disclosure, a method of playing a musical composition that employs instrumentation during a base wagering game, includes: receiving an input indicative of a wager at a gaming terminal; responsive to receiving the input, conducting a base wagering game at the gaming terminal, the base wagering game including a plurality of bonus triggers including a first bonus trigger and a final bonus trigger; responsive to an occurrence of the first bonus trigger during the base wagering game, playing through an audio speaker system an introduction portion of the musical composition having an initial layer of instrumentation; responsive to an occurrence of each subsequent one of the bonus triggers during the base wagering game, successively, with each such occurrence, adding a further layer of instrumentation to the musical composition played through the audio speaker system until the final bonus trigger occurs; and responsive to the occurrence of the final bonus trigger, initiating the bonus game while playing a main theme or chorus of the musical composition.

According to a further aspect of the present disclosure, a computer program product comprising a computer readable medium having an instruction set borne thereby, the instruction set being configured to cause, upon execution by a controller, the acts of: receiving an input indicative of a wager at a gaming terminal; responsive to receiving the input, conducting a base wagering game at the gaming terminal; providing at least two bonus triggers in the base wagering game such that responsive to all of the bonus triggers occurring during the base wagering game, a bonus game is initiated; responsive to a first bonus trigger occurring during the base wagering game, playing through an audio speaker of a gaming terminal a first track of the musical composition to initiate an introduction portion of the musical composition; responsive to a second bonus trigger occurring during the base wagering game, playing through the audio speaker a second track of the musical composition such that both the first and the second tracks are played through the audio speaker simultaneously; and following occurrence of a last one of the bonus triggers during the base wagering game, playing through the audio speaker the main theme or chorus of the musical composition that includes the first and second tracks, and initiating the bonus game.

According to a still further aspect of the present disclosure, a method of playing a multi-track musical composition during a wagering game that successively adds musical tracks from an introduction portion of music that leads into a main theme or chorus of the musical composition, includes: receiving an input indicative of a wager at a gaming terminal; responsive to receiving the input, conducting a base wagering game at the gaming terminal; providing a bonus trigger in the base wagering game such that responsive to the bonus trigger occurring during the base wagering game, a bonus game is initiated; responsive to a first event occurring during the base wagering game, playing through an audio speaker system of a gaming terminal a first track of the musical composition to initiate an introduction portion of the musical composition; responsive to a second event occurring during the base wagering game, playing a second track of the musical composition through the audio speaker system such that both the first and the second tracks are played through the audio speaker system simultaneously; and following occurrence of the bonus trigger during the base wagering game, playing through the audio speaker system the main theme or chorus of the musical composition that includes the first and second tracks, and initiating the bonus game.

According to yet another aspect of the present disclosure, a method of playing a musical composition during a wagering game through one or more audio speakers, includes: receiving an input indicative of a wager at a gaming terminal; responsive to receiving the input, conducting a base wagering game at the gaming terminal; providing a bonus trigger in the base wagering game such that responsive to the bonus trigger occurring during the base wagering game, a bonus game is initiated; mapping a plurality of audio channels to corresponding ones of a plurality of audio speakers of an audio speaker system coupled to the gaming terminal; responsive to a first event occurring during the base wagering game, playing the first audio channel of the musical composition through a first of the audio speakers but not a second of the audio speakers; responsive to a second event occurring during the base wagering game, continuing to play the first audio channel through the first audio speaker and playing the second audio channel of the musical composition through the second of the audio speakers such that some but not all of the audio channels of the musical composition are being played; and following occurrence of the bonus trigger during the base wagering game, playing all of the audio channels of the musical composition through all of the audio speakers, and initiating the bonus game.

Additional aspects of the invention will be apparent to those of ordinary skill in the art in view of the detailed description of various embodiments, which is made with reference to the drawings, a brief description of which is provided below.

DETAILED DESCRIPTION

Figure 1:
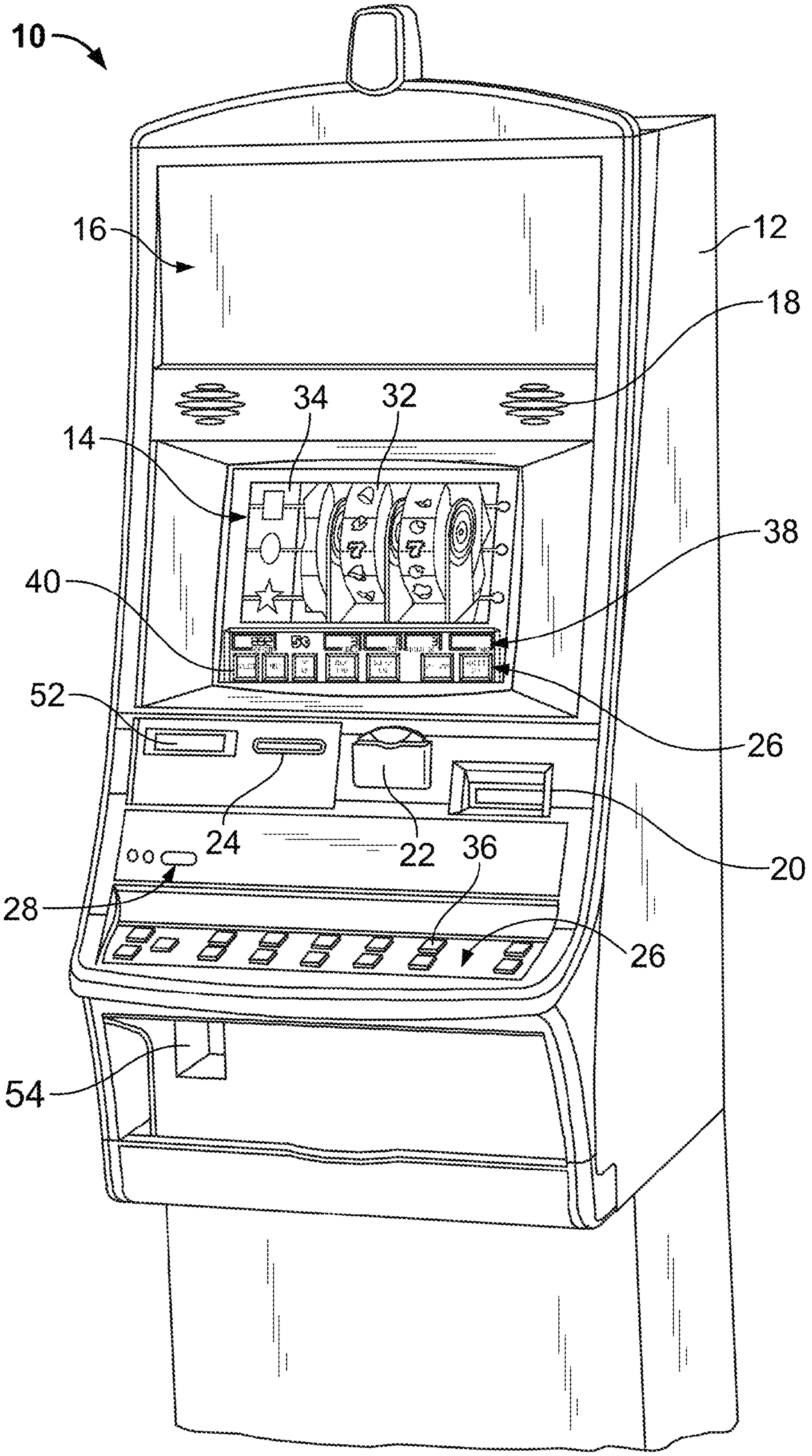
FIG. 1 (Prior Art)
FIG. 1 is a perspective view of a free-standing gaming terminal according to an aspect of the present disclosure.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, there is shown a gaming terminal 10 similar to those used in gaming establishments, such as casinos. With regard to the present invention, the gaming terminal 10 may be any type of gaming terminal and may have varying structures and methods of operation. For example, in some aspects, the gaming terminal 10 is be an electromechanical gaming terminal configured to play mechanical slots, whereas in other aspects, the gaming terminal is an electronic gaming terminal configured to play a video casino game, such as slots, keno, poker, blackjack, roulette, craps, etc. It should be understood that although the gaming terminal 10 is shown as a free-standing terminal of the upright type, the gaming terminal is readily amenable to implementation in a wide variety of other forms such as a free-standing terminal of the slant-top type, a portable or handheld device primarily used for gaming, such as is disclosed by way of example in PCT Patent Application No. PCT/US2007/000792 filed Jan. 26, 2007, titled “Handheld Device for Wagering Games,” which is incorporated herein by reference in its entirety, a mobile telecommunications device such as a mobile telephone or personal digital assistant (PDA), a counter-top or bar-top gaming terminal, or other personal electronic device, such as a portable television, MP3 player, entertainment device, etcetera.

The gaming terminal 10 illustrated in FIG. 1 comprises a cabinet or housing 12. For output devices, this embodiment of the gaming terminal 10 includes a primary display area 14, a secondary display area 16, and one or more audio speakers 18. The primary display area 14 and/or secondary display area 16 variously displays information associated with wagering games, non-wagering games, community games, progressives, advertisements, services, premium entertainment, text messaging, emails, alerts or announcements, broadcast information, subscription information, etc. appropriate to the particular mode(s) of operation of the gaming terminal. For input devices, the gaming terminal 10 illustrated in FIG. 1 includes a bill validator 20, a coin acceptor 22, one or more information readers 24, one or more player-input devices 26, and one or more player-accessible ports 28 (e.g., an audio output jack for headphones, a video headset jack, a wireless transmitter/receiver, etc.). While these typical components found in the gaming terminal 10 are described below, it should be understood that numerous other peripheral devices and other elements exist and are readily utilizable in any number of combinations to create various forms of a gaming terminal in accord with the present concepts.

The primary display area 14 include, in various aspects of the present concepts, a mechanical-reel display, a video display, or a combination thereof in which a transmissive video display is disposed in front of the mechanical-reel display to portray a video image in superposition over the mechanical-reel display. Further information concerning the latter construction is disclosed in U.S. Pat. No. 6,517,433 to Loose et al. entitled “Reel Spinning Slot Machine With Superimposed Video Image,” which is incorporated herein by reference in its entirety. The video display is, in various embodiments, a cathode ray tube (CRT), a high-resolution liquid crystal display (LCD), a plasma display, a light emitting diode (LED), a DLP projection display, an electroluminescent (EL) panel, or any other type of display suitable for use in the gaming terminal 10, or other form factor, such as is shown by way of example in FIG. 1. The primary display area 14 includes, in relation to many aspects of wagering games conducted on the gaming terminal 10, one or more paylines 30 (see FIG. 3) extending along a portion of the primary display area. In the illustrated embodiment of FIG. 1, the primary display area 14 comprises a plurality of mechanical reels 32 and a video display 34, such as a transmissive display (or a reflected image arrangement in other embodiments), in front of the mechanical reels 32. If the wagering game conducted via the gaming terminal 10 relies upon the video display 34 only and not the mechanical reels 32, the mechanical reels 32 are optionally removed from the interior of the terminal and the video display 34 is advantageously of a non-transmissive type. Similarly, if the wagering game conducted via the gaming terminal 10 relies only upon the mechanical reels 32, but not the video display 34, the video display 34 depicted in FIG. 1 is replaced with a conventional glass panel. Further, in still other embodiments, the video display 34 is disposed to overlay another video display, rather than a mechanical-reel display, such that the primary display area 14 includes layered or superimposed video displays. In yet other embodiments, the mechanical-reel display of the above-noted embodiments is replaced with another mechanical or physical member or members such as, but not limited to, a mechanical wheel (e.g., a roulette game), dice, a pachinko board, or a diorama presenting a three-dimensional model of a game environment.

Video images in the primary display area 14 and/or the secondary display area 16 are rendered in two-dimensional (e.g., using Flash Macromedia™) or three-dimensional graphics (e.g., using Renderware™). In various aspects, the video images are played back (e.g., from a recording stored on the gaming terminal 10), streamed (e.g., from a gaming network), or received as a TV signal (e.g., either broadcast or via cable) and such images can take different forms, such as animated images, computer-generated images, or “real-life” images, either prerecorded (e.g., in the case of marketing/promotional material) or as live footage. The format of the video images can include any format including, but not limited to, an analog format, a standard digital format, or a high-definition (HD) digital format.

The player-input or user-input device(s) 26 include, by way of example, a plurality of buttons 36 on a button panel, as shown in FIG. 1, a mouse, a joy stick, a switch, a microphone, and/or a touch screen 38 mounted over the primary display area 14 and/or the secondary display area 16 and having one or more soft touch keys 40, as is also shown in FIG. 1. In still other aspects, the player-input devices 26 comprise technologies that do not rely upon physical contact between the player and the gaming terminal, such as speech-recognition technology, gesture-sensing technology, eye-tracking technology, etc. The player-input or user-input device(s) 26 thus accept(s) player input(s) and transforms the player input(s) to electronic data signals indicative of a player input or inputs corresponding to an enabled feature for such input(s) at a time of activation (e.g., pressing a "Max Bet" button or soft key to indicate a player's desire to place a maximum wager to play the wagering game). The input(s), once transformed into electronic data signals, are output to a CPU or controller 42 (see FIG. 2) for processing. The electronic data signals are selected from a group consisting essentially of an electrical current, an electrical voltage, an electrical charge, an optical signal, an optical element, a magnetic signal, and a magnetic element.

The information reader 24 (or information reader/writer) is preferably located on the front of the housing 12 and comprises, in at least some forms, a ticket reader, card reader, bar code scanner, wireless transceiver (e.g., RFID, Bluetooth, etc.), biometric reader, or computer-readable-storage-medium interface. As noted, the information reader may comprise a physical and/or electronic writing element to permit writing to a ticket, a card, or computer-readable-storage-medium. The information reader 24 permits information to be transmitted from a portable medium (e.g., ticket, voucher, coupon, casino card, smart card, debit card, credit card, etc.) to the information reader 24 to enable the gaming terminal 10 or associated external system to access an account associated with cashless gaming, to facilitate player tracking or game customization, to retrieve a saved-game state, to store a current-game state, to cause data transfer, and/or to facilitate access to casino services, such as is more fully disclosed, by way of example, in U.S. Patent Publication No. 2003/0045354 entitled "Portable Data Unit for Communicating With Gaming Machine Over Wireless Link," which is incorporated herein by reference in its entirety. The noted account associated with cashless gaming is, in some aspects of the present concepts, stored at an external system 46 (see FIG. 2) as more fully disclosed in U.S. Pat. No. 6,280,328 to Holch et al. entitled "Cashless Computerized Video Game System and Method," which is incorporated herein by reference in its entirety, or is alternatively stored directly on the portable storage medium. Various security protocols or features can be used to enhance security of the portable storage medium. For example, in some aspects, the individual carrying the portable storage medium is required to enter a secondary independent authenticator (e.g., password, PIN number, biometric, etc.) to access the account stored on the portable storage medium.

Figure 2:
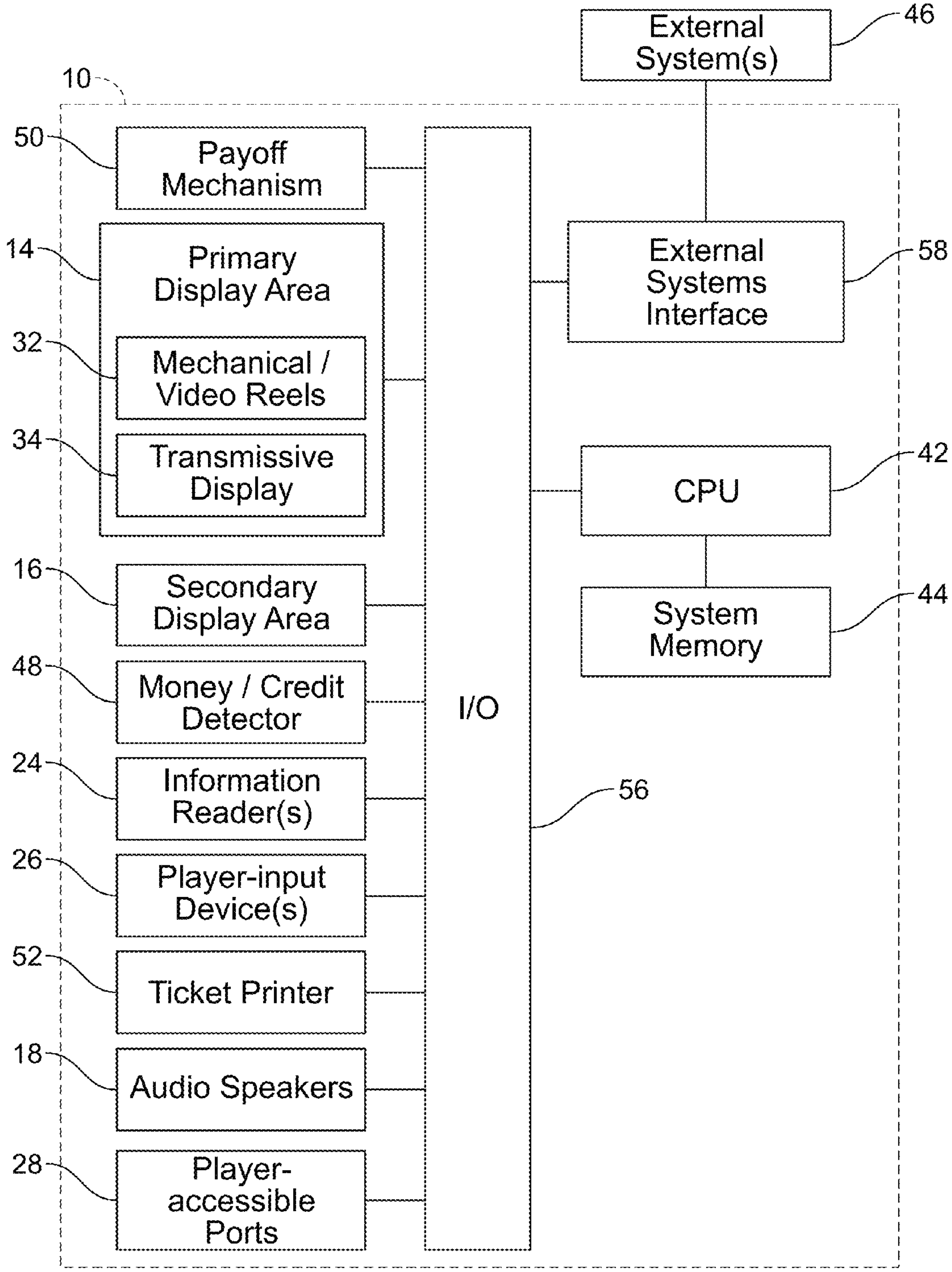
FIG. 2 (Prior Art)
FIG. 2 is a schematic view of a gaming system according to an aspect of the present disclosure.

Turning now to FIG. 2, the various components of the gaming terminal 10 are controlled by one or more processors (e.g., CPU, distributed processors, etc.) 42, also referred to herein generally as a controller (e.g., microcontroller, microprocessor, etc.). The controller 42 can include any suitable processor(s), such as an Intel® Pentium processor, Intel® Core 2 Duo processor, AMD Opteron™ processor, or UltraSPARC® processor. By way of example, the controller 42 includes a plurality of microprocessors including a master processor, a slave processor, and a secondary or parallel processor. Controller 42, as used herein, comprises any combination of hardware, software, and/or firmware disposed in and/or disposed outside of the gaming terminal 10 that is configured to communicate with and/or control the transfer of data between the gaming terminal 10 and a bus, another computer, processor, or device and/or a service and/or a network. The controller 42 comprises one or more controllers or processors and such one or more controllers or processors need not be disposed proximal to one another and may be located in different devices and/or in different locations. For example, a first processor is disposed proximate a user interface device (e.g., a push button panel, a touch screen display, etc.) and a second processor is disposed remotely from the first processor, the first and second processors being electrically connected through a network. As another example, the first processor is disposed in a first enclosure (e.g., a gaming machine) and a second processor is disposed in a second enclosure (e.g., a server) separate from the first enclosure, the first and second processors being communicatively connected through a network. The controller 42 is operable to execute all of the various gaming methods and other processes disclosed herein.

To provide gaming functions, the controller 42 executes one or more game programs comprising machine-executable instructions stored in local and/or remote computer-readable data storage media (e.g., memory 44 or other suitable storage device). The term computer-readable data storage media, or "computer-readable medium," as used herein refers to any media/medium that participates in providing instructions to controller 42 for execution. The computer-readable medium comprises, in at least some exemplary forms, non-volatile media (e.g., optical disks, magnetic disks, etc.), volatile media (e.g., dynamic memory, RAM), and transmission media (e.g., coaxial cables, copper wire, fiber optics, radio frequency (RF) data communication, infrared (IR) data communication, etc). Common forms of computer-readable media include, for example, a hard disk, magnetic tape (or other magnetic medium), a 2-D or 3-D optical disc (e.g., a CD-ROM, DVD, etc.), RAM, PROM, EPROM, FLASH-EPROM, any other memory chip or solid state digital data storage device, a carrier wave, or any other medium from which a computer can read. By way of example, a plurality of storage media or devices are provided, a first storage device being disposed proximate the user interface device and a second storage device being disposed remotely from the first storage device, wherein a network is connected intermediate the first one and second one of the storage devices.

Various forms of computer-readable media may be involved in carrying one or more sequences of one or more instructions to controller 42 for execution. By way of example, the instructions may initially be borne on a data storage device of a remote device (e.g., a remote computer, server, or system). The remote device can load the instructions into its dynamic memory and send the instructions over a telephone line or other communication path using a modem or other communication device appropriate to the communication path. A modem or other communication device local to the gaming machine 10 or to an external system 46 associated with the gaming machine can receive the data on the telephone line or conveyed through the communication path (e.g., via external systems interface 58) and output the data to a bus, which transmits the data to the system memory 44 associated with the processor 42, from which system memory the processor retrieves and executes the instructions.

Thus, the controller 42 is able to send and receive data, via carrier signals, through the network(s), network link, and communication interface. The data includes, in various examples, instructions, commands, program code, player data, and game data. As to the game data, in at least some aspects of the present concepts, the controller 42 uses a local random number generator (RNG) to randomly generate a wagering game outcome from a plurality of possible outcomes. Alternatively, the outcome is centrally determined using either an RNG or pooling scheme at a remote controller included, for example, within the external system 46.

As shown in the example of FIG. 2, the controller 42 is coupled to the system memory 44. The system memory 44 is shown to comprise a volatile memory (e.g., a random-access memory (RAM)) and a non-volatile memory (e.g., an EEPROM), but optionally includes multiple RAM and multiple program memories.

As shown in the example of FIG. 2, the controller 42 is also coupled to a money/credit detector 48. The money/credit detector 48 is configured to output a signal the controller 42 that money and/or credits have been input via one or more value-input devices, such as the bill validator 20, coin acceptor 22, or via other sources, such as a cashless gaming account, etc. The value-input device(s) is integrated with the housing 12 of the gaming terminal 10 and is connected to the remainder of the components of the gaming terminal 10, as appropriate, via a wired connection, such as I/O 56, or wireless connection. The money/credit detector 48 detects the input of valid funds into the gaming terminal 10 (e.g., via currency, electronic funds, ticket, card, etc.) via the value-input device(s) and outputs a signal to the controller 42 carrying data regarding the input value of the valid funds. The controller 42 extracts the data from these signals from the money/credit detector 48, analyzes the associated data, and transforms the data corresponding to the input value into an equivalent credit balance that is available to the player for subsequent wagers on the gaming terminal 10, such transforming of the data being effected by software, hardware, and/or firmware configured to associate the input value to an equivalent credit value. Where the input value is already in a credit value form, such as in a cashless gaming account having stored therein a credit value, the wager is simply deducted from the available credit balance.

As seen in FIG. 2, the controller 42 is also connected to, and controls, the primary display area 14, the player-input device (s) 26, and a payoff mechanism 50. The payoff mechanism 50 is operable in response to instructions from the controller 42 to award a payoff to the player in response to certain winning outcomes that occur in the base game, the bonus game(s), or via an external game or event. The payoff is provided in the form of money, credits, redeemable points, advancement within a game, access to special features within a game, services, another exchangeable media, or any combination thereof. Although payoffs may be paid out in coins and/or currency bills, payoffs are alternatively associated with a coded ticket (from a ticket printer 52), a portable storage medium or device (e.g., a card magnetic strip), or are transferred to or transmitted to a designated player account. The payoff amounts distributed by the payoff mechanism 50 are determined by one or more pay tables stored in the system memory 44.

Communications between the controller 42 and both the peripheral components of the gaming terminal 10 and the external system 46 occur through input/output (I/O) circuit 56, which can include any suitable bus technologies, such as an AGTL+ frontside bus and a PCI backside bus. Although the I/O circuit 56 is shown as a single block, it should be appreciated that the I/O circuit 56 alternatively includes a number of different types of I/O circuits. Furthermore, in some embodiments, the components of the gaming terminal 10 can be interconnected according to any suitable interconnection architecture (e.g., directly connected, hypercube, etc.).

The I/O circuit 56 is connected to an external system interface or communication device 58, which is connected to the external system 46. The controller 42 communicates with the external system 46 via the external system interface 58 and a communication path (e.g., serial, parallel, IR, RC, 10bT, near field, etc.). The external system 46 includes, in various aspects, a gaming network, other gaming terminals, a gaming server, a remote controller, communications hardware, or a variety of other interfaced systems or components, in any combination. In yet other aspects, the external system 46 may comprise a player's portable electronic device (e.g., cellular phone, electronic wallet, etc.) and the external system interface 58 is configured to facilitate wireless communication and data transfer between the portable electronic device and the controller 42, such as by a near field communication path operating via magnetic field induction or a frequency-hopping spread spectrum RF signals (e.g., Bluetooth, etc.).

The gaming terminal 10 optionally communicates with external system 46 (in a wired or wireless manner) such that each terminal operates as a "thin client" having relatively less functionality, a "thick client" having relatively more functionality, or with any range of functionality therebetween (e.g., an "intermediate client"). In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets are contained within the gaming terminal 10 ("thick client" gaming terminal), the external systems 46 ("thin client" gaming terminal), or are distributed therebetween in any suitable manner ("intermediate client" gaming terminal).

Figure 3:
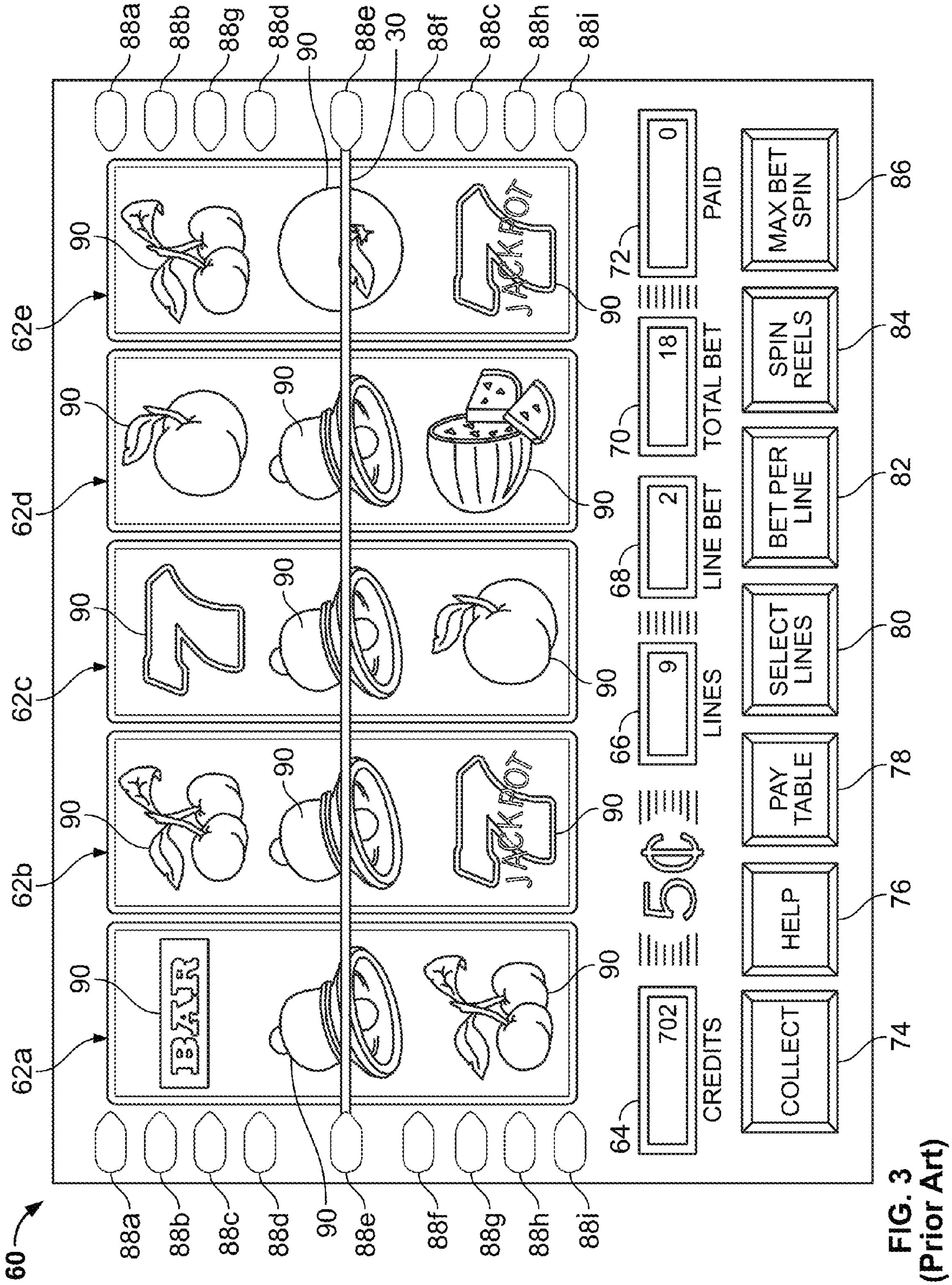
FIG. 3 (Prior Art)
FIG. 3 is an image of an exemplary basic-game screen of a wagering game displayed on a gaming terminal, according to an aspect of the present disclosure.

Referring now to FIG. 3, an image of a basic-game screen 60 adapted to be displayed on the primary display area 14 is illustrated, according to one embodiment of the present invention. A player begins play of a basic wagering game by providing a wager. A player can operate or interact with the wagering game using the one or more player-input devices 26. The controller 42, the external system 46, or both, in alternative embodiments, operate(s) to execute a wagering game program causing the primary display area 14 to display the wagering game that includes a plurality of visual elements.

In accord with various methods of conducting a wagering game on a gaming system in accord with the present concepts, the wagering game includes a game sequence in which a player makes a wager, such as through the money/credit detector 48, touch screen 38 soft key, button panel, or the like, and a wagering game outcome is associated with the wager. The wagering game outcome is then revealed to the player in due course following initiation of the wagering game. The method comprises the acts of conducting the wagering game using a gaming apparatus, such as the gaming terminal 10 depicted in FIG. 1, following receipt of an input from the player to initiate the wagering game. The gaming terminal 10 then communicates the wagering game outcome to the player via one or more output devices (e.g., primary display 14) through the display of information such as, but not limited to, text, graphics, text and graphics, static images, moving images, etc., or any combination thereof. In accord with the method of conducting the wagering game, the controller 42, which comprises one or more processors, transforms a physical player input, such as a player's pressing of a "Spin Reels" soft key 84 (see FIG. 3), into an electronic data signal indicative of an instruction relating to the wagering game (e.g., an electronic data signal bearing data on a wager amount).

In the aforementioned method, for each data signal, the controller 42 is configured to processes the electronic data signal, to interpret the data signal (e.g., data signals corresponding to a wager input), and to cause further actions associated with the interpretation of the signal in accord with computer instructions relating to such further actions executed by the controller. As one example, the controller 42 causes the recording of a digital representation of the wager in one or more storage devices (e.g., system memory 44 or a memory associated with an external system 46), the controller, in accord with associated computer instructions, causing the changing of a state of the data storage device from a first state to a second state. This change in state is, for example, effected by changing a magnetization pattern on a magnetically coated surface of a magnetic storage device or changing a magnetic state of a ferromagnetic surface of a magneto-optical disc storage device, a change in state of transistors or capacitors in a volatile or a non-volatile semiconductor memory (e.g., DRAM), etc.). The noted second state of the data storage device comprises storage in the storage device of data representing the electronic data signal from the controller (e.g., the wager in the present example). As another example, the controller 42 further, in accord with the execution of the instructions relating to the wagering game, causes the primary display 14 or other display device and/or other output device (e.g., speakers, lights, communication device, etc.), to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of computer instructions relating to the wagering game is further conducted in accord with a random outcome (e.g., determined by the RNG) that is used by the controller 42 to determine the outcome of the game sequence, using a game logic for determining the outcome based on the randomly generated number. In at least some aspects, the controller 42 is configured to determine an outcome of the game sequence at least partially in response to the random parameter.

The basic-game screen 60 is displayed on the primary display area 14 or a portion thereof. In FIG. 3, the basic-game screen 60 portrays a plurality of simulated movable reels 62*a-e*. Alternatively or additionally, the basic-game screen 60 portrays a plurality of mechanical reels or other video or mechanical presentation consistent with the game format and theme. The basic-game screen 60 also advantageously displays one or more game-session meters and various buttons adapted to be actuated by a player.

In the illustrated embodiment of FIG. 3, the game-session meters include a "credit" meter 64 for displaying a number of credits available for play on the terminal; a "lines" meter 66 for displaying a number of paylines to be played by a player on the terminal; a "line bet" meter 68 for displaying a number of credits wagered (e.g., from 1 to 5 or more credits) for each of the number of paylines played; a "total bet" meter 70 for displaying a total number of credits wagered for the particular round of wagering; and a "paid" meter 72 for displaying an amount to be awarded based on the results of the particular round's wager. The depicted user-selectable buttons include a "collect" button 74 to collect the credits remaining in the credits meter 64; a "help" button 76 for viewing instructions on how to play the wagering game; a "pay table" button 78 for viewing a pay table associated with the basic wagering game; a "select lines" button 80 for changing the number of paylines (displayed in the lines meter 66) a player wishes to play; a "bet per line" button 82 for changing the amount of the wager which is displayed in the line-bet meter 68; a "spin reels" button 84 for moving the reels 62*a-e*; and a "max bet spin" button 86 for wagering a maximum number of credits and moving the reels 62*a-e* of the basic wagering game. While the gaming terminal 10 allows for these types of player inputs, the present invention does not require them and can be used on gaming terminals having more, less, or different player inputs.

As shown in the example of FIG. 3, paylines 30 extend from one of the payline indicators 88*a-i* on the left side of the basic-game screen 60 to a corresponding one of the payline indicators 88*a-i* on the right side of the screen 60. A plurality of symbols 90 is displayed on the plurality of reels 62*a-e* to indicate possible outcomes of the basic wagering game. A winning combination occurs when the displayed symbols 90 correspond to one of the winning symbol combinations listed in a pay table stored in the memory 44 of the terminal 10 or in the external system 46. The symbols 90 may include any appropriate graphical representation or animation, and may further include a "blank" symbol.

Symbol combinations are evaluated in accord with various schemes such as, but not limited to, "line pays" or "scatter pays." Line pays are evaluated left to right, right to left, top to bottom, bottom to top, or any combination thereof by evaluating the number, type, or order of symbols 90 appearing along an activated payline 30. Scatter pays are evaluated without regard to position or paylines and only require that such combination appears anywhere on the reels 62*a-e*. While an embodiment with nine paylines is shown, a wagering game with no paylines, a single payline, or any plurality of paylines will also work with the present invention. Additionally, though an embodiment with five reels is shown in FIG. 3, different embodiments of the gaming terminal 10 comprise a greater or lesser number of reels in accordance with the present invention.

Figure 4:
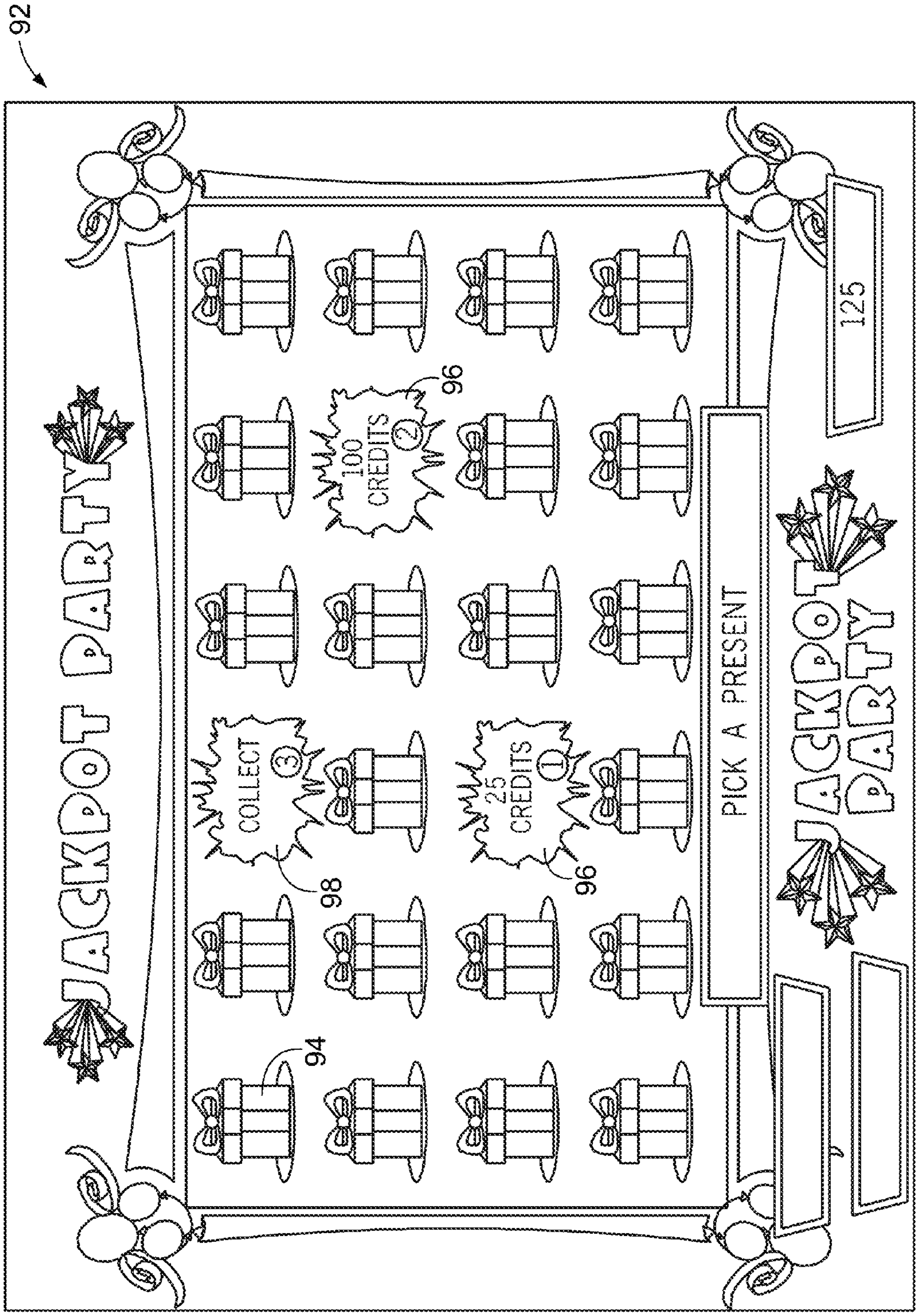
FIG. 4 (Prior Art)
FIG. 4 is an image of a bonus-game screen of an exemplary wagering game displayed on a gaming terminal, according to an aspect of the present disclosure.

Turning now to FIG. 4, an example of a bonus game to a basic wagering game is illustrated. A bonus-game screen 92 includes an array of markers 94 located in a plurality of columns and rows. The bonus game is entered upon the occurrence of a triggering event, such as the occurrence of a start-bonus game outcome (e.g., symbol trigger, mystery trigger, time-based trigger, etc.) in or during the basic wagering game. Alternatively, any bonus game described herein is able to be deployed as a stand-alone wagering game independent of a basic wagering game.

In the illustrated bonus game of FIG. 4, a player selects, one at a time, from the array of markers 94 to reveal an associated bonus-game outcome. According to one embodiment of this bonus game, each marker 94 in the array is associated with an award outcome 96 (e.g., credits or other non-negative outcomes) or an end-game outcome 98. In the illustrated example, a player has selected an award outcome 96 with the player's first two selections (25 credits and 100 credits, respectively). When one or more end-game outcome 98 is selected (as illustrated by the player's third pick), the bonus game is terminated and the accumulated award outcomes 96 are provided to the player.

Figure 5:
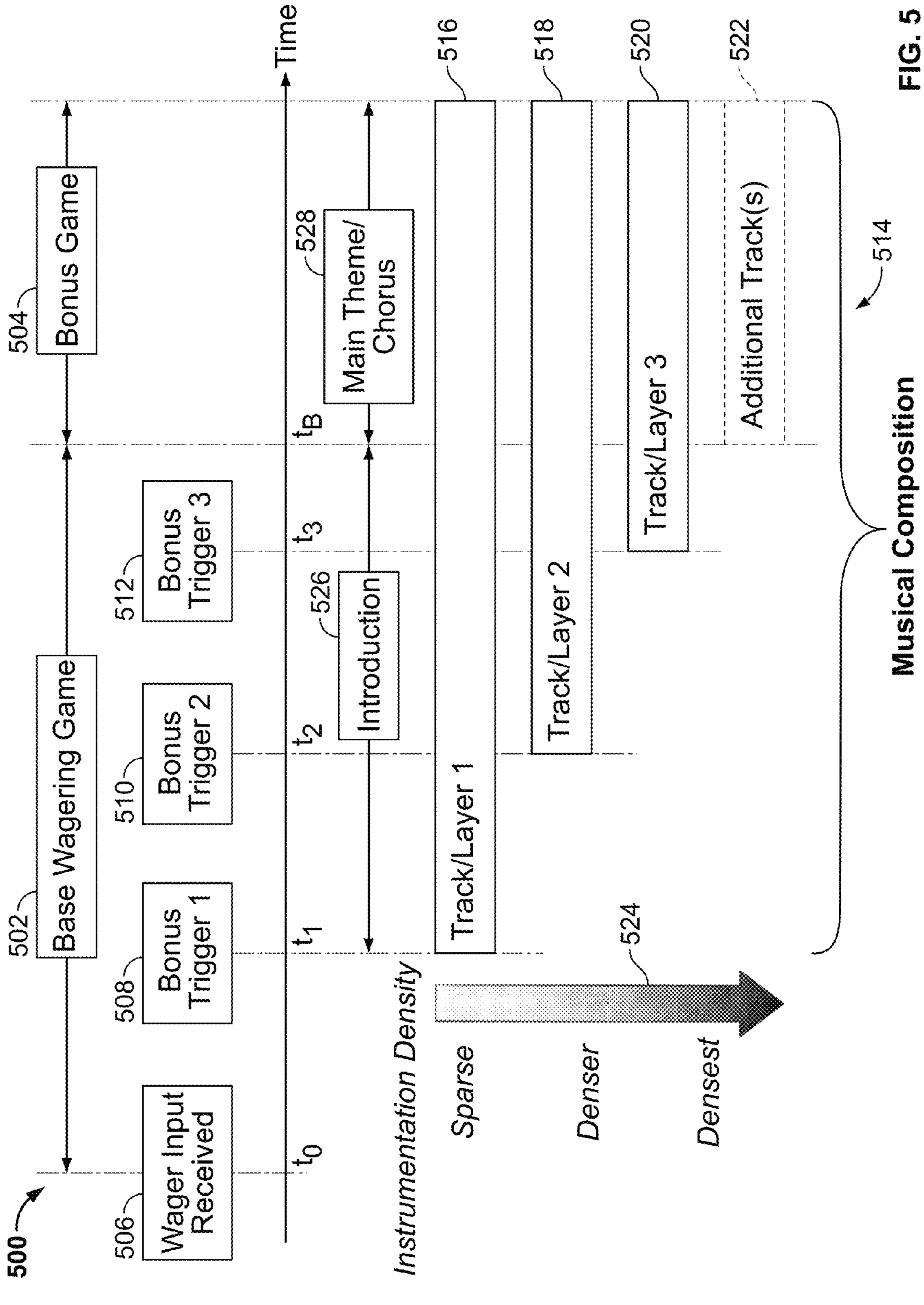
FIG. 5 is a functional diagram of a sequence of musical tracks that are played during a base wagering game as bonus triggers occur to initiate a bonus game.

FIG. 5 is a functional block diagram of a wagering game 500 having a base wagering game 502, like the basic wagering game shown in FIG. 3, and a bonus game 504, like the bonus game shown in FIG. 4. A horizontal time axis is shown (not necessarily to scale) indicating a temporal sequence of wagering-game events in this example. At time $t_0$, a wager input is received (506) at a gaming terminal, like the gaming terminal 10 described above, to initiate the base wagering game 502. During the base wagering game 502, up to three bonus triggers 508, 510, 512 can occur. If all three bonus triggers 508, 510, 512 occur during the base wagering game 502, the player is eligible to play the bonus game 504. When the base wagering game 502 is slots, a predetermined bonus trigger symbol can appear on each reel, and as the reels are spun or made to appear to spin, if the reel stops at the predetermined bonus trigger symbol, a bonus trigger has occurred. In this example, three bonus triggers 508 510, 512 must occur in the base wagering game 502 to cause the bonus game 504 to be initiated, though fewer or more than three bonus triggers can be used instead.

In response to a first bonus trigger 508 occurring during the base wagering game 502 at time $t_1$, a first musical track or layer 516 of a musical composition (i.e., a piece of music) 514 is played through the one or more audio speakers 18 of the gaming terminal 10. The musical composition 514 includes a musical introduction portion 526 or verse and a musical main theme or musical chorus 528. The musical composition 514 can be any type of music with any type of arrangement and instrumentation. For example, the composition can be a popular song with instruments and a vocal melody or an orchestral composition where the instruments carry the melody. The terms "verse," "introduction," "main theme," and "chorus" are used herein as they would be understood by musicians or in a musical context. Musicians refer to the "chorus" as the "hook" or intended focal point of a musical composition in the context of a popular song. Musicians refer to the "main theme" as the central musical idea in a classical or non-pop music context. The "introduction" or "verse" refers to the part of the musical composition that precedes the main theme or chorus and leads compositionally into the main theme or chorus. "Instrumentation" refers to the number and type of instruments that are used in a musical composition. At this stage of the musical composition 514, the instrumentation density or fullness is relatively sparse compared to the remainder of the musical composition 514 as indicated by the downward instrumentation density arrow 524, which indicates that the instrumentation density increases toward the arrow. For example, the first track (as holds true for all the tracks) can be composed of or produced by a solo iteration of any number of instruments or combination of instruments, such as a percussion, stringed, electronic, wind, brass, or vocal instrument. For example any track can include a percussion instrument and an electric bass. Or it can include a solo wind instrument only, or an electronic instrument or a solo or group vocal. This first track 516 serves as the foundation for the other tracks to build upon, and therefore the overall composition 514 is at its most sparse, because none of the other tracks has yet entered to build on top of it. As will be explained below, as the other tracks (i.e. tracks 518 and 520) enter, the musical composition 514 becomes increasingly dense instrumentally and grows in intensity and complexity.

In response to a second bonus trigger 510 occurring during the base wagering game 502 at time $t_2$, a second musical track or layer 518 of the musical composition 514 is played through the one or more audio speakers 18 of the gaming terminal 10. The second musical track 518 can be added to, layered with, or mixed with the first musical track 516, such that the player hears both musical tracks 516, 518 simultaneously through the one or more audio speakers 18. At this stage of the multi-track musical composition 514, both musical tracks 516 and 518 are playing concurrently, so the total instrumental density of the composition is greater compared with the relative sparseness of the first musical track 516 played alone. This change is indicated by the instrumentation density arrow 524. The aural effect produced is that of the musical composition building in intensity and complexity. The instrumentation of which the second musical track 518 is composed can be the same or different from the instrumentation of which the first musical track 518 is composed. For example, the first musical track 516 can be composed of percussion instrumentation, and the second musical track 518 can add further percussion instrumentation.

In response to a third bonus trigger 512 occurring during the base wagering game 502 at time t3, a third musical track or layer 520 of the musical composition 514 is played through the one or more audio speakers 18 of the gaming terminal 10. The third musical track 520 is added to or layered or mixed with the first and second musical tracks 516, 518, such that the listener hears all three musical tracks 516, 518, 520 simultaneously through the one or more audio speakers 18. At this stage of the multi-track musical composition 514, all three musical tracks (516, 518, and 520) are playing concurrently, and therefore the total instrumentation density of the composition is greater compared with the relative sparseness of the composition when the first musical track 516 is played by itself, or when both tracks 516 and 518 are played simultaneously. This change is indicated by the instrumentation density arrow 524. The aural effect produced is that of the musical composition continuing to build in intensity and complexity.

At time $t_B$, following the occurrence of the third and final bonus trigger 512, the musical composition 514 seamlessly launches into the main theme or chorus 528 portion as the bonus game 504 is initiated such that the introduction portion 526 or verse transitions to the main theme or chorus 528 of the musical composition 514 following the occurrence of the final bonus trigger such that the introduction portion 526 and the main theme or chorus 528 are audibly contiguous. Optional additional tracks or layers 522 can be added to or layered or mixed with the musical tracks being played during the bonus game 504. As the bonus game 504 is being displayed to the player at the gaming terminal 10, the musical composition 514 continues to play the main theme or chorus 528 until the bonus game 504 ends.

The time between $t_0$ and $t_B$ can be preferably between 8-12 seconds, or longer, such as 15-20 seconds. A trade-off exists between maximizing coin-in throughput at the gaming terminal while allowing enough time to build excitement and anticipation to hold the player's interest in the wagering game. The multi-track introductory song herein is particularly well-suited for slot games with three or five reels, but can be used with any number of reels. A pause between each reel spinning and stopping can be introduced to allow the musical composition to build as bonus triggers occur during the base wagering game 502.

Although three bonus triggers 508, 510, 512 are shown in FIG. 5, in other implementations, as few as two bonus triggers or more than three bonus triggers can be required to secure eligibility for playing the bonus game 504. At each occurrence of each bonus trigger, the instrumentation density of the musical composition 514 increases as additional musical tracks or layers are added or mixed into the ongoing composition 514 to create a richer and more dense composition. Additionally, if it becomes impossible to achieve the required number of bonus triggers during the base wagering game 502 after at least one bonus trigger has started the musical composition 514, the composition 514 is stopped altogether, either once all the reels have stopped spinning, or once there are no longer enough spinning reels remaining to accumulate enough triggers to enter the bonus. For example, suppose three bonus triggers are required to play the bonus game 504, and there are five reels on the base wagering game 502. After the player initiates a spin, if a bonus trigger lands on reel one, the musical composition 514 starts playing the first musical track 516. If none of the other reels lands on a bonus trigger, the musical composition 514 can either play until all five reels have stopped spinning, at which point the musical composition 514 ceases to be played through the one or more audio speakers 18, or the musical composition 514 can cease to be played once no trigger has landed on reel four, because there is no longer a possibility of entering the bonus once three triggers can no longer be accumulated for that spin.

It should be noted in FIG. 5 that the number of bonus triggers achieved corresponds to the number of musical tracks played. Thus, when two bonus triggers 508, 510 have been achieved during the base wagering game 502, two musical tracks 516, 518 are played through the one or more audio speakers 18. In other implementations, the number of bonus triggers do not necessarily have to correspond with the number of musical tracks played. For example, with each bonus trigger, the number of musical tracks played can double.

In some implementations, it is possible to trigger during the base wagering game additional bonus triggers beyond the minimum number of bonus triggers needed to satisfy eligibility to participate in the bonus game. For example, if a minimum of three bonus triggers must occur during the base wagering game to satisfy eligibility to play the bonus game, a fourth or even a fifth bonus trigger can still occur during the base wagering game. By hitting all five bonus triggers, the fullest and most dense and intense version of the main theme or chorus of the musical composition is played through the one or more audio speakers. If only three bonus triggers occur during the base wagering game, a less dense version of the main theme or chorus is played with fewer tracks than the fullest version played when five bonus triggers are triggered. Thus, the fully fleshed out, most intense and dense version of the musical composition is played only when all five bonus triggers occur during the base wagering game.

Figure 6:
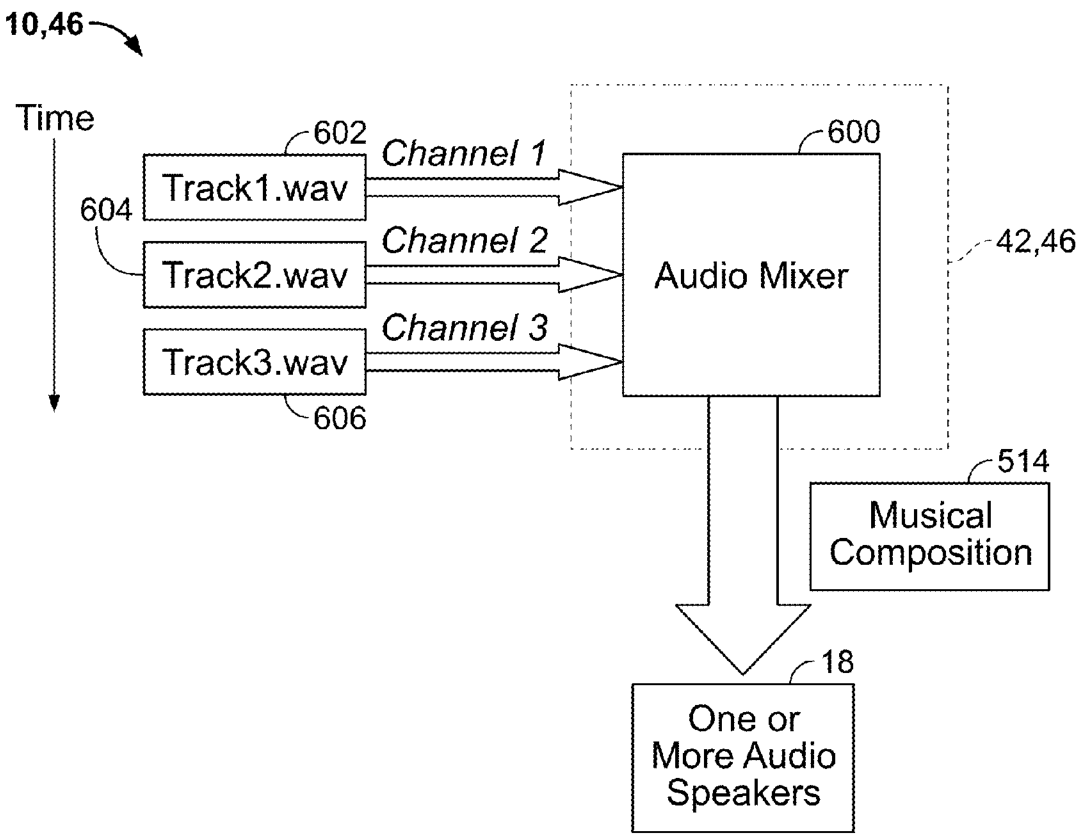
FIG. 6 is a functional block diagram of a system for mixing multiple musical tracks into an audio output to be played on one or more speakers.

FIG. 6 is a functional block diagram of a system for implementing the musical composition of the present disclosure. The system can be incorporated into the gaming terminal 10 or into an external system 46 communicatively coupled to the gaming terminal 10. The gaming terminal 10 or external system 46 includes an audio mixer 600 that can be realized in hardware (such as an integrated circuit chip), software, or a combination thereof. The audio mixer 600 can be part of the controller 42 of the gaming terminal 10 or incorporated into the external system 46 to which the gaming terminal 10 is communicatively coupled. The audio mixer 600 includes multiple channel inputs, three in this example. In this example, three musical tracks are stored as audio files (as .WAV audio format files in this example, though any other audio format is contemplated) 602, 604, 606 in a memory accessible by the audio mixer 600.

In response to the occurrence of the first bonus trigger 508, the audio mixer 600 receives a first musical track audio file 602 at a first channel input and outputs the audio content of the first musical track audio file 602 as a musical composition 514 to the audio speaker(s) 18. In response to the occurrence of the second bonus trigger 510 a period of time after the occurrence of the first bonus trigger 508, the audio mixer 600 receives the second musical track 604 at a second channel input, mixes or combines the second musical track of the audio file 604 with the first musical track of the audio file 602 to produce a mixed track composed of the two musical tracks, and outputs the audio content of the mixed track as the musical composition 514 to the audio speaker(s) 18. Both musical tracks corresponding to the audio files 602, 604 can be heard by the player by virtue of the audio mixing carried out by the audio mixer 600. Similarly, in response to the occurrence of the third bonus trigger 512 a period of time after the occurrence of the second bonus trigger 510, the audio mixer 600 receives the third musical track audio file 606 at a third channel input, mixes or combines the third musical track of the audio file 606 with the first and second musical tracks of the audio files 602, 604 to produce a mixed track composed of all three musical tracks, and outputs the audio content of the mixed track as the musical composition 514 to the audio speaker(s) 18. All three musical tracks corresponding to the audio files 602, 604, 606 can be heard simultaneously by the player by virtue of the audio mixing carried out by the audio mixer 600.

As described above, each musical track audio file 602, 604, 606 is composed of a musical instrumentation or orchestration, which optionally includes a human vocal. When played or mixed together, the musical tracks combine to create a richer or more dense sound compared to when they are played individually. The instrumentation can be the same or different from track to track. Preferably, the theme of the musical composition 514 is related to a theme of the base wagering game 502 and/or the bonus game 504.

Alternately, instead of storing each musical track as a separate audio file and mixing or combining them together in the audio mixer 600 as shown in FIG. 6, each musical track to be played in response to the occurrence of a bonus trigger can be stored as an audio file that includes all of the instrumentation to be played following the bonus trigger. For example, a first audio file is composed of a base level of instrumentation only, and is played in response to the occurrence of a first bonus trigger 508. A second audio file is composed of the base level of instrumentation and an additional level of instrumentation, which has already been incorporated or pre-mixed into the audio file such that no further mixing or combining needs to be carried out, and is played in response to the occurrence of a second bonus trigger 510. Additional audio files are composed of additional levels of instrumentation compared to earlier-played audio files.

Figure 7:
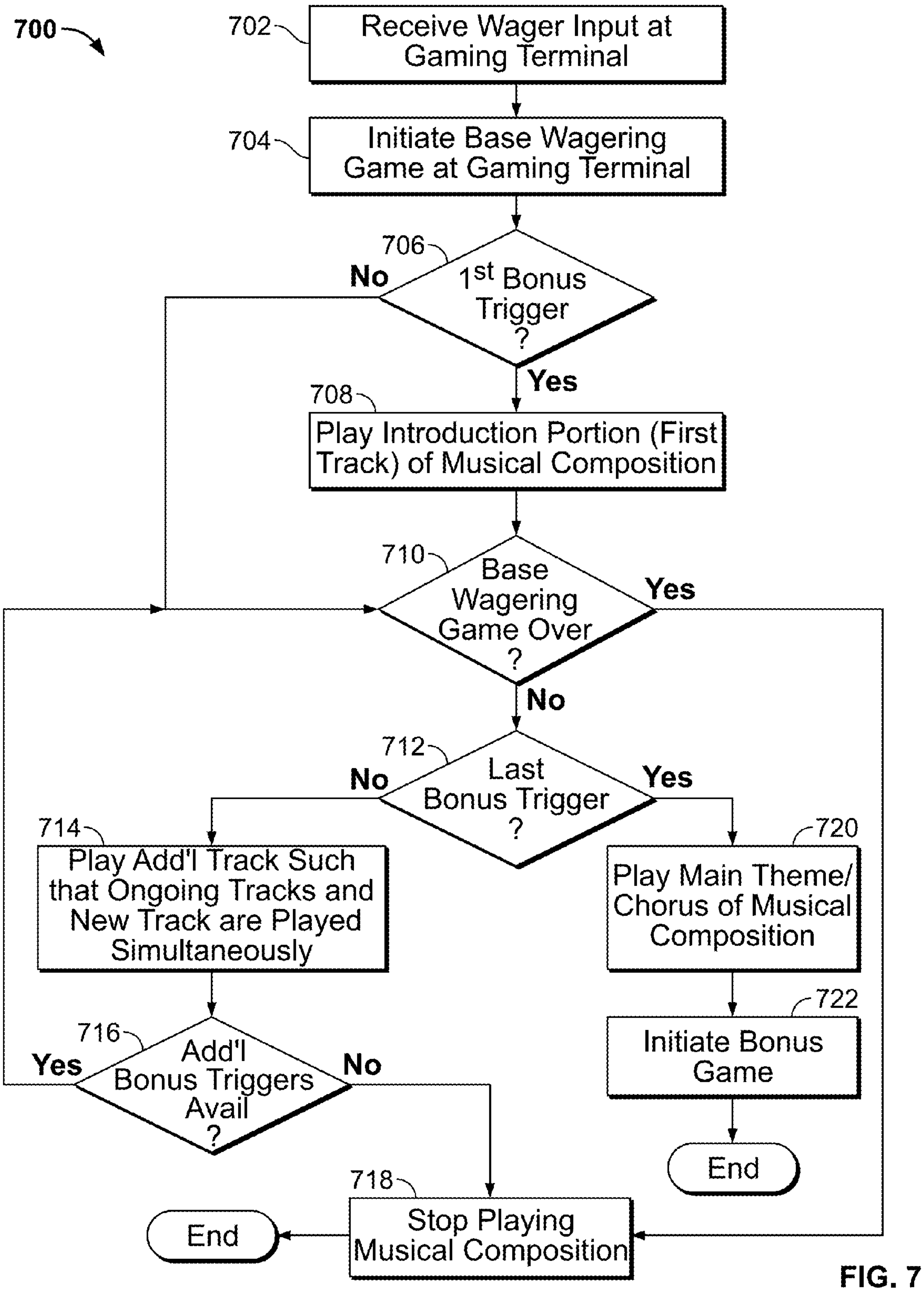
FIG. 7 is a is a flowchart for an algorithm that corresponds to instructions executed by a controller in accord with at least some aspects of the present disclosure.

FIG. 7, described by way of example above, represents an algorithm 700 that corresponds to at least some machine-readable instructions executed by the controller 42 and/or external systems 46 in FIG. 2 to perform the above-described functions associated with the present disclosure. The algorithm 700 receives an input indicative of a wager at a gaming terminal 10 (702). The algorithm 700 causes a base wagering game, such as the base wagering game 502, to be initiated at the gaming terminal 10 (704). The algorithm 700 determines whether a first bonus trigger, such as the first bonus trigger 508, has occurred during the base wagering game 502 (706). If so, the algorithm 700 plays through the audio speaker 18 an introduction portion or verse composed of a first musical track, such as the first musical track 516, of a musical composition, such as the musical composition 514 (708). The algorithm 700 determines whether the base wagering game 502 is over (710). For example, when the base wagering game 502 is a slots game and there are five reels, the base wagering game 502 is over when the fifth reel has spun to a stop, revealing its symbol to the player. If the base wagering game 502 is over, the algorithm 700 stops playing the musical composition 718 through the audio speaker 18.

If a first bonus trigger has not occurred, the algorithm 700 continues to check whether the base wagering game 502 is over (710). As long as the base wagering game 502 is not over, the algorithm 700 continues to check whether a first bonus trigger occurs. In the case of a slots game, a first bonus trigger occurs when one of the reels spins to a stop, revealing a predetermined symbol that is indicative of a bonus trigger. A predetermined number of these bonus triggers need to occur (such as three) during the base wagering game to satisfy eligibility to initiate a bonus game following the base wagering game.

If another bonus trigger occurs during the base wagering game 502, the algorithm 700 determines whether the bonus trigger is the last bonus trigger (such as the third bonus trigger) to satisfy eligibility to initiate a bonus game 504 (712). If there are still additional bonus triggers to satisfy eligibility to play the bonus game 504, the algorithm 700 plays an additional (new) musical track through the audio speaker 18 such that the previous track(s) and the new musical track are currently being played simultaneously through the audio speaker 18 (714). For example, if a second bonus trigger, such as the second bonus trigger 510, occurs during the base wagering game, the algorithm 700 plays a second track 518 through the audio speaker 18 such that both the first and second musical tracks 516, 518 are played simultaneously through the audio speaker 18.

The algorithm 700 determines whether additional bonus triggers are available to be triggered during the base wagering game (716). In the case of a slots game, if there are five reels and the fifth reel has not spun to a stop, the algorithm 700 determines that there are still additional bonus triggers that can occur during the base wagering game. If there are additional bonus triggers available to be triggered during the base wagering game, the algorithm 700 proceeds to block (710) to determine whether the base wagering game is over. If there are no additional bonus triggers available to be triggered during the base wagering game, and not all bonus triggered required to trigger the bonus game have occurred, the algorithm 700 stops the musical composition from being played through the audio speaker 18 (718).

If the algorithm 700 determines that the last bonus trigger has occurred, such as a third bonus trigger 512 in an exemplary base wagering game that requires three bonus triggers to occur to initiate a bonus game, the algorithm 700 plays a main theme or chorus of the musical composition through the audio speaker 18 (720), and initiates the bonus game (722).

The algorithm 700 or any other algorithm disclosed herein corresponds to specially programmed instructions executed by one or more general purpose controllers, such as the controller 42, for example. The structure(s) corresponding to the functions or acts carried out or performed by the algorithm 700 or any other algorithm disclosed herein is/are the controller 42 or the external systems 46, or any combination thereof, specially programmed for carrying out or performing the specified functions or acts. It is emphasized that any of the functions or acts for implementing any of the algorithms disclosed herein can be carried out or performed by more than one general purpose controller or computer.

In the above-described implementations, a musical track is added each time a bonus trigger occurs during the base wagering game. However, in other implementations of the present disclosure, a musical track can be added to the musical composition based on other events or occurrences during the base wagering game besides a bonus trigger (i.e., "non-trigger events"), or a combination of bonus triggers and non-trigger events. A non-trigger event can include a random event that occurs randomly during the base wagering game or achievement by the player of a certain win or credit threshold during the base wagering game. As the base wagering game unfolds before the player, the player can hear the instrumentation of the musical composition build and grow in intensity and density during the base wagering game without necessarily being tied to any visual graphics on the base wagering game. In other words, the auditory experience created by incrementally adding tracks to the musical composition during the base wagering game contributes to building a sense of anticipation and excitement in the player.

The above-described implementations refer to enhancing the instrumentation density of a musical composition played following a bonus trigger. In the implementations described below, instead of or in addition to enhancing the aural density of the musical composition, the directionality of the sound perceived by the player can be enhanced as additional bonus triggers are accrued by adding audio channels and playing additional musical tracks through additional speakers as the build-up to the bonus game occurs. The effect to the player is that when a first bonus trigger or non-trigger event occurs, the musical composition is played through a subset of audio speakers disposed around the player at the gaming terminal. As additional trigger or non-trigger events occur during the base wagering game, the musical composition is played through additional audio speakers such that when the bonus game is finally triggered, the player is completely immersed in full surround sound.

Figure 8:
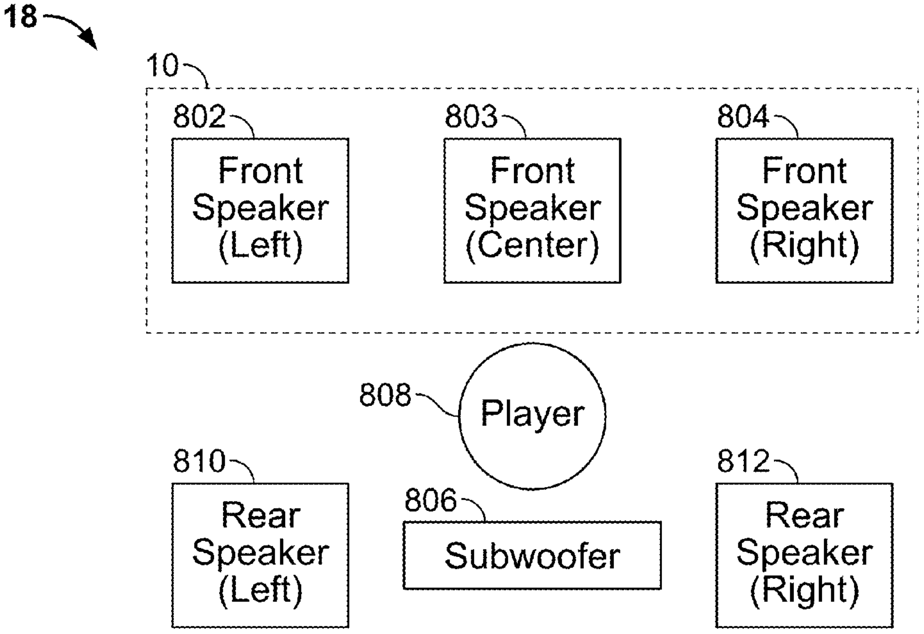
FIG. 8 is a functional block diagram of an audio speaker system arranged in a 5.1 surround format.

FIG. 8 illustrates an exemplary configuration for the one or more audio speakers 18. The one or more audio speakers 18 comprise an audio speaker system that includes five audio speakers, a front left audio speaker 802, a front center audio speaker, a front right audio speaker 804, a subwoofer audio speaker 806, a rear left audio speaker 810, and a rear right audio speaker 812 positioned around a player 808 seated or standing in front of the gaming terminal 10. At least two audio speakers are positioned on opposite sides of the player 808 (e.g., speakers 802, 810 are positioned on opposite sides of the player 808, and so, too, are speakers 802, 812, for example). Each of the audio speakers 802, 803, 804, 806, 810, 812 is associated with a distinct audio channel. In this example, the audio speakers 802, 803, 804, 806, 810, 812 and associated audio channels are configured in a 5.1 channel surround configuration and formatted according to Dolby, DTS, or SDDS formats, for example. The audio speakers 802, 803, 804 can be optionally incorporated into the gaming terminal 10. In this example, the audio speakers 806, 810, 812 are auxiliary audio speakers.

Several examples of enhancing the directionality of sound sent through the audio speakers associated with the gaming terminal will now be discussed with reference to FIGS. 5 and 9. In an example, the first track 516 is played through at least one of the audio channels, or in this particular example, a pair of audio channels such as through the audio channels corresponding to the left and right front audio speakers 802, 804. In response to the second bonus trigger 510 occurring the directionality of sound produced during play of the musical composition 514 is altered by playing the second track 518 through at least one other audio channel, or in this particular example, a second pair of the audio channels that was not activated during play of the first track 516. For example, the second track can be played through the left and right rear audio speakers 810, 812. The effect to the listener would be of the sound changing from an all-front perspective, to a completely immersive surround sound perspective.

In another example, the percentage of sound played during the various tracks can be changed as the musical composition is played and building up to the main theme or chorus of a bonus game. FIG. 9 represents a diagram of wagering game 900 similar to the one shown in FIG. 5, except that the percentage of sound played through the various audio speakers is indicated instead of the instrumentation density of the musical composition. The wagering game 900 includes a base wagering game 902 and a bonus game 904. Following receipt of a wager input 906 to play the base wagering game 902 on the gaming terminal 10, a base wagering game melody is played 100% through the front audio speakers, such as the audio speakers 802, 804 only. At some point during the base wagering game 902, a first bonus trigger or non-trigger event 908 can occur. Examples of such events were discussed above. In response to the first event 908 occurring, a first track or layer 916 of a musical composition 914 begins to play. The percentage of the sound of the musical composition 914 played through the front audio speakers 802, 804 is reduced to 80% and the remaining 20% of the sound of the musical composition 914 is played through the rear audio speakers, such as the rear audio speakers 810, 812.

In response to a second event 910 occurring in the base wagering game 902, a second track 918 begins to play. The percentage of sound of the musical composition 914 is again changed such that 50% of the sound is played through the front audio speakers 802, 804, and 50% of the sound is played through the rear audio speakers 810, 812. The percentage of sound can refer to the volume or intensity of the sound. In response to a third event 912 occurring in the base wagering game 902, a third track 920 begins to play. As the third track 920 launches into the main theme or chorus, a full surround effect is achieved as the subwoofer audio speaker 806 is brought in, filling out the full audio spectrum with low frequency/bass audio, while optionally dynamically panning the sound from front to rear and/or from left to right to create audio motion from speaker to speaker. The player experiences the full surround effect during the main theme or chorus 928 through all available audio channels, an effect that is not experienced during the base wagering game 902.

Figure 9:
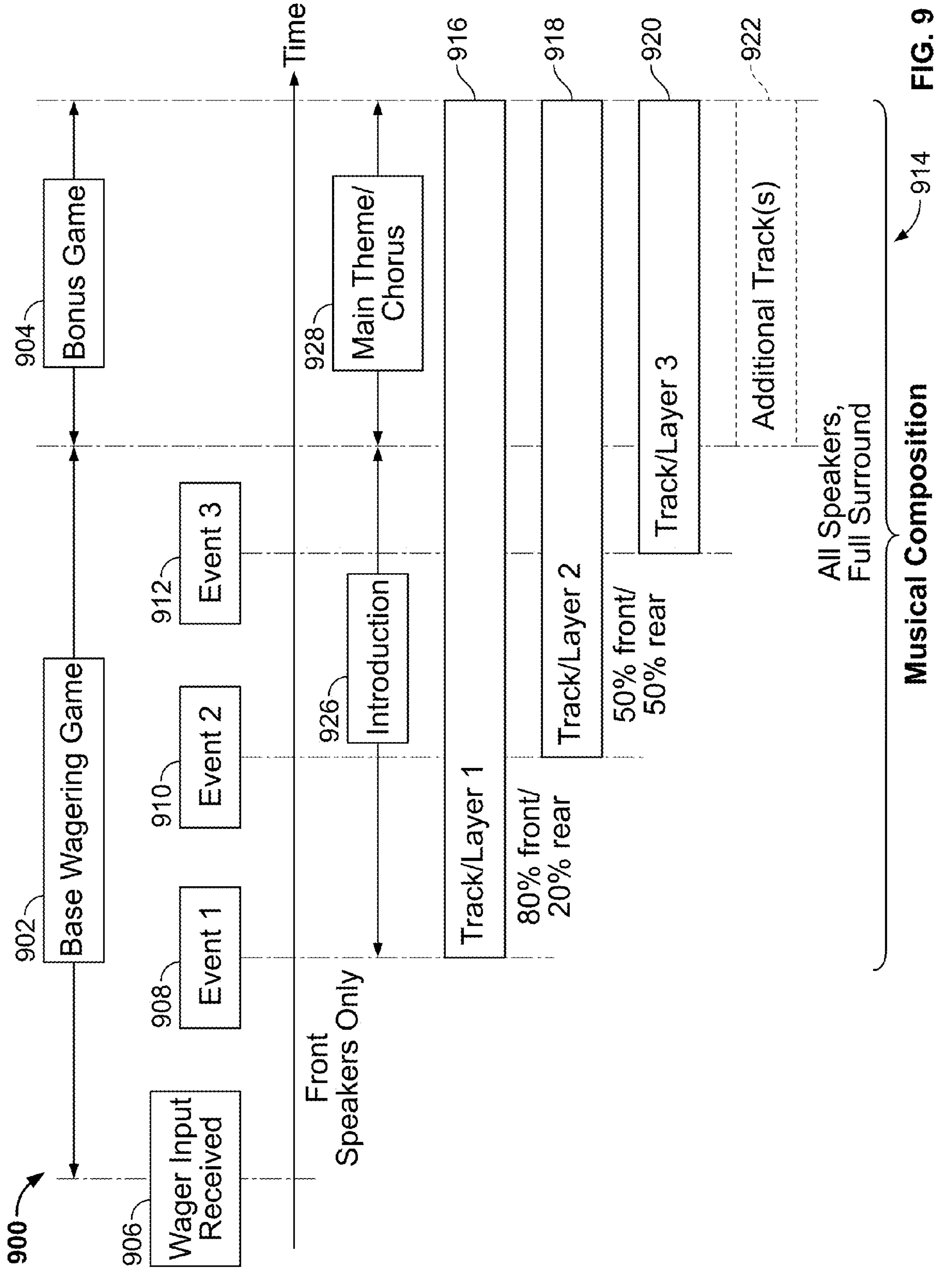
FIG. 9 is a functional block diagram of a sequence of musical tracks that are played in various percentages through different combinations of audio speakers shown in FIG. 8.

Although FIG. 9 illustrates tracks 916, 918, 920 being successively added as events 908, 910, 912 occur during the base wagering game 902, in other aspects, a single musical track can be played throughout the base wagering game 902, with the directionality of sound played through the audio speakers 18 being changed as events 908, 910, 912 occur during the base wagering game 902.

When combined with the layering of musical tracks, the sound directionality aspects discussed above further enhance the aural experience for the player and builds excitement and anticipation through the aural experience. Not only is the musical instrumentation of the musical composition increasing in density as bonus triggers or other non-trigger events occur during the base wagering game, but the number of audio channels through which the musical composition is played increases, which in turn increases opportunity for dynamic panning between audio speakers, which further enhances the aural experience.

It should be noted that the algorithm 700 and other algorithms disclosed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a computer-readable medium as above as modules in any manner, and can be used separately or in combination.

While particular embodiments and applications of the present disclosure have been illustrated and described, it is to be understood that this disclosure is not limited to the precise construction and compositions disclosed herein and that various modifications, changes, and variations can be apparent from the foregoing descriptions without departing from the spirit and scope of the invention as defined in the appended claims.

What is claimed is:

1. A method of playing a multi-track musical composition during a base wagering game that successively adds musical tracks that form an introduction portion of music that leads into a main theme or chorus of the musical composition, comprising:

receiving an input indicative of a wager at a gaming terminal;

responsive to receiving the input, conducting the base wagering game at the gaming terminal, the base wagering game having a first randomly selected bonus trigger, a second randomly selected bonus trigger, and a third randomly selected bonus trigger, each of the randomly selected bonus triggers selected independent of player choice when conducting the base wagering game;

providing the first, second and third bonus triggers in the base wagering game such that responsive to the first, second and third bonus triggers selected during the base wagering game, a bonus game is initiated;

responsive to the first bonus trigger randomly selected during the base wagering game, playing through an audio speaker system a first track of the musical composition to initiate an introduction portion of the musical composition;

responsive to the second bonus trigger randomly selected during the base wagering game, playing a second track of the musical composition through the audio speaker system such that both the first and the second tracks are played through the audio speaker system simultaneously; and following selection of the third bonus trigger during the base wagering game, playing through the audio speaker system the main theme or chorus of the musical composition that includes the first and second tracks, and initiating the bonus game.

2. The method of claim 1, further comprising continuing to play the main theme or chorus of the musical composition during the bonus game.

3. The method of claim 1, further comprising ceasing playing the musical composition through the audio speaker system responsive to not all of the bonus triggers occurring during the base wagering game.

4. The method of claim 1, further comprising mixing the second track of the musical composition with the first track.

5. The method of claim 1, wherein the base wagering game is a game of slots, the method further comprising responsive to a fourth bonus trigger occurring during the base wagering game, playing a third track of the musical composition through the audio speaker such that the first, second, and third tracks are played through the audio speaker simultaneously.

6. The method of claim 5, further comprising mixing the third track with the first and second tracks.

7. The method of claim 1, wherein the first track and the second track are each produced by a distinct solo iteration or combination of a percussion, stringed, electronic, wind, brass, or vocal instrument, and wherein the musical composition is a song or an orchestral composition.

8. The method of claim 1, further comprising storing the first and the second tracks as separate audio files in a memory accessible by the gaming terminal.

9. The method of claim 1, wherein the second track is pre-mixed with the first track and stored as an audio file in a memory accessible by the gaming terminal.

10. The method of claim 1, wherein the audio speaker system comprises a plurality of audio speakers each associated with an audio channel, the audio speakers being positioned on opposite sides of a player at the gaming terminal, wherein the playing the first track includes playing the first track through at least one of the audio channels, the method further comprising:

responsive to randomly selecting the second bonus trigger, changing the directionality of the sound produced during play of the musical composition by playing the second track through at least another one of the audio channels.

11. The method of claim 1, wherein the audio speaker system comprises a plurality of audio speakers, the method further comprising changing a percentage of sound played during play of the first track through the plurality of audio speakers responsive to the second track being played.

12. The method of claim 1, wherein the audio speaker system comprises a plurality of audio speakers each associated with an audio channel, wherein the playing the second track is played through more audio channels compared to the first track.

13. The method of claim 12, wherein the playing the main theme or chorus is played through the plurality of audio speakers in full surround utilizing all of the audio channels associated with the plurality of audio speakers.

14. The method of claim 1, wherein the audio speaker system comprises a front set of audio speakers in the gaming terminal and a plurality of auxiliary audio speakers surrounding a player at the gaming terminal, the method further comprising playing the base wagering game through the front set of audio speakers only, wherein the playing the first track is played through a first number of the auxiliary audio speakers, and wherein the playing the second track is played through a second number of the auxiliary audio speakers, the second number being greater than the first.

15. A method of conducting a base wagering game for a human player, the base wagering game including a game sequence in which a player provides an input and a wagering game outcome is determined, the method comprising:

using a user interface device to accept the player input, and transforming the player input to electronic data signals indicative of a wager to play the base wagering game;

using one or more processors to interpret the wager from the data signals and to cause the recording of a digital representation of the wager in one or more storage devices;

using at least one of the processors to initiate the game sequence of the base wagering game on the gaming apparatus, the game sequence including a first randomly selected bonus trigger, a second randomly selected bonus trigger, and a third randomly selected bonus trigger, each of the randomly selected bonus triggers selected independent of player choice when conducting the base wagering game;

responsive to the first bonus trigger randomly selected during the game sequence, playing a first track of the musical composition to initiate an introduction portion of the musical composition;

responsive to the second bonus trigger randomly selected during the game sequence, adding a second track of the musical composition to the first track and playing the first and the second tracks simultaneously; and following selection of the third bonus trigger during the game sequence, playing the main theme or chorus of the musical composition including the first and second tracks;

using at least one of the processors to cause an audio device to play the musical composition; and initiate a bonus game while playing the main theme or chorus.

16. A method of playing a musical composition that employs instrumentation during a base wagering game, comprising:

receiving an input indicative of a wager at a gaming terminal;

responsive to receiving the input, conducting the base wagering game at the gaming terminal, the base wagering game including a plurality of randomly selected bonus triggers including a first bonus trigger and a final bonus trigger, each of the randomly selected bonus triggers selected independent of player choice when conducting the wagering game;

responsive to randomly selecting the first bonus trigger during the base wagering game, playing through an audio speaker an introduction portion of the musical composition;

responsive to randomly selecting each subsequent one of the bonus triggers during the base wagering game, successively, with each such occurrence, increasing a density of the instrumentation of the musical composition played through the audio speaker until the final bonus trigger occurs; and responsive to the random selection of the final bonus trigger, initiating a bonus game while playing a main theme or chorus of the musical composition.

17. The method of claim 16, wherein the bonus triggers includes an intermediate bonus trigger, wherein the density of the instrumentation has an initial density in response to the selection of the first bonus trigger, wherein the density is increased relative to the initial density to an intermediate density in response to the selection of the intermediate bonus trigger, and wherein the density is further increased relative to the intermediate density to a full density in response to the selection of the final bonus trigger.

18. The method of claim 16, wherein the musical composition also employs voice.

19. The method of claim 16, wherein the introduction portion transitions to the main theme or chorus of the musical composition responsive to the occurrence of the final bonus trigger such that the introduction portion and the main theme or chorus are audibly contiguous.

20. A method of playing a musical composition that employs instrumentation during a base wagering game, comprising:

receiving an input indicative of a wager at a gaming terminal;

responsive to receiving the input, conducting the base wagering game at the gaming terminal, the base wagering game including a plurality of randomly selected bonus triggers including a first bonus trigger and a final bonus trigger, each of the randomly selected bonus triggers selected independent of player choice when conducting the base wagering game;

responsive to randomly selecting the first bonus trigger during the base wagering game, playing through an audio speaker system an introduction portion of the musical composition having an initial layer of instrumentation;

responsive to randomly selecting each subsequent one of the bonus triggers during the base wagering game, successively, with each such occurrence, adding a further layer of instrumentation to the musical composition played through the audio speaker system until the final bonus trigger occurs; and responsive to the random selection of the final bonus trigger, initiating a bonus game while playing a main theme or chorus of the musical composition.

21. A computer program product comprising a non-transitory computer readable medium having an instruction set borne thereby, the instruction set being configured to cause, upon execution by a controller, the acts of:

receiving an input indicative of a wager at a gaming terminal;

responsive to receiving the input, conducting a base wagering game at the gaming terminal, the base wagering game having a first randomly selected bonus trigger, a second randomly selected bonus trigger, and a third randomly selected bonus trigger, each of the randomly selected bonus triggers selected independent of player choice when conducting the base wagering game;

providing the first, second and third bonus triggers in the base wagering game such that responsive to the first, second and third bonus triggers selected during the base wagering game, a bonus game is initiated;

responsive to the first bonus trigger randomly selected during the base wagering game, playing through an audio speaker of a gaming terminal a first track of the musical composition to initiate an introduction portion of the musical composition;

responsive to the second bonus trigger randomly selected during the base wagering game, playing through the audio speaker a second track of the musical composition such that both the first and the second tracks are played through the audio speaker simultaneously; and following selection of the third bonus trigger during the base wagering game, playing through the audio speaker the main theme or chorus of the musical composition that includes the first and second tracks, and initiating a bonus game.

22. A method of playing a multi-track musical composition during a base wagering game that successively adds musical tracks from an introduction portion of music that leads into a main theme or chorus of the musical composition, comprising:

receiving an input indicative of a wager at a gaming terminal;

responsive to receiving the input, conducting the base wagering game at the gaming terminal, the base wagering game having a first randomly selected event and a second randomly selected event, both randomly selected events selected independent of player choice when conducting the wagering game;

providing a randomly selected bonus trigger in the base wagering game such that responsive to the bonus trigger selected during the base wagering game, a bonus game is initiated;

responsive to the first event randomly selected during the base wagering game, playing through an audio speaker system of a gaming terminal a first track of the musical composition to initiate an introduction portion of the musical composition;

responsive to the second event randomly selected during the base wagering game, playing a second track of the musical composition through the audio speaker system such that both the first and the second tracks are played through the audio speaker system simultaneously; and following random selection of the bonus trigger during the base wagering game, playing through the audio speaker system the main theme or chorus of the musical composition that includes the first and second tracks, and initiating the bonus game.

23. A method of playing a musical composition during a base wagering game through one or more audio speakers, comprising:

receiving an input indicative of a wager at a gaming terminal;

responsive to receiving the input, conducting the base wagering game at the gaming terminal, the base wagering game having a first randomly selected event and a second randomly selected event, both randomly selected events selected independent of player choice when conducting the wagering game;

providing a randomly selected bonus trigger in the base wagering game such that responsive to the bonus trigger selected during the base wagering game, a bonus game is initiated;

mapping a plurality of audio channels to corresponding ones of a plurality of audio speakers of an audio speaker system coupled to the gaming terminal;

responsive to the first event randomly selected during the base wagering game, playing the first audio channel of the musical composition through a first of the audio speakers but not a second of the audio speakers;

responsive to the second event randomly selected during the base wagering game, continuing to play the first audio channel through the first audio speaker and playing the second audio channel of the musical composition through the second of the audio speakers such that some but not all of the audio channels of the musical composition are being played; and following selection of the bonus trigger during the base wagering game, playing all of the audio channels of the musical composition through all of the audio speakers, and initiating the bonus game.

24. The method of claim 1, wherein the base wagering game includes a plurality of reels defining a symbol array, the plurality of reels including at least a first reel, a second reel and a third reel; and wherein the first bonus trigger is indicated in the symbol array by the first reel, the second bonus trigger is indicated in the symbol array by the second reel, and the third bonus trigger is indicated in the symbol array by the third reel.

* * * * *